United States Patent Office 3,102,915
Patented Sept. 3, 1963

3,102,915
ORGANIC FLUORINE COMPOUNDS AND
PROCESS FOR MAKING SAME
Murray Hauptschein, Montgomery County, and Milton Braid, Philadelphia County, Pa., assignors to Pennsalt Chemicals Corporation, Philadelphia, Pa., a corporation of Pennsylvania
No Drawing. Original application July 23, 1957, Ser. No. 673,578, now Patent No. 3,008,966, dated Nov. 14, 1961. Divided and this application May 17, 1961, Ser. No. 115,849
10 Claims. (Cl. 260—608)

This invention relates to a novel process for the preparation of organic compounds containing fluorine and to new and useful organic compounds containing both fluorine and sulfur. This application is a division of our copending application Serial No. 673,578, filed July 23, 1957.

The value of fluorine in organic compounds has long been recognized. In general, the presence of fluorine gives much greater chemical and thermal stability than would be present in compounds not containing fluorine, and such properties are highly desirable in many industrial applications.

The desirability of introducing sulfur into fluorine-containing organic compounds has also been known. Sulfur-containing fluoroorganic compounds have many uses such as in high pressure lubricants, cutting oils, insecticides, and heat transfer fluids. In addition, the sulfur group is valuable in providing compounds which serve as intermediates in the production of other valuable fluoroorganic compounds.

It has now been found that fluorine-containing organic iodides may be reacted with mercuric sulfide to provide a series of polysulfides or to provide novel heterocyclic compounds depending upon the iodide used and the reaction conditions. These novel heterocyclic compounds are especially useful as heat transfer media and high temperature coolants.

In accordance with this invention, there is provided a method for making organic fluorine compounds containing sulfur, which comprises reacting an iodide having the formula $$RC_1YFI$$

where R is a member of the class consisting of perfluoroalkyl groups having from 1–30 carbons and perfluorochloroalkyl groups having from 1–30 carbons and having the carbon atom $\alpha$ to the $C_1$ carbon atom in the formula free from chlorine atoms directly attached thereto, and Y is a member of the class consisting of fluorine, chlorine, perfluoroalkyl groups having from 1–6 carbon atoms and perfluorochloroalkyl groups having from 1–6 carbon atoms, and having the carbon atom $\alpha$ to the $C_1$ carbon atom in the formula free from chlorine atoms directly attached thereto, with mercuric sulfide.

It will be understood that the invention involves reactants in which the R and Y substituents are the same as well as those in which they are different.

As used in this application, a "perfluoroalkyl" group means a substituted alkyl group containing only fluorine and carbon.

A "perfluorochloroalkyl" group is a substituted alkyl group containing only fluorine, chlorine and carbon, and in which the atomic ratio of fluorine to chloride is greater than one.

The reaction varies somewhat depending upon whether the iodide used is a primary or secondary iodide. When primary iodides are used, the reaction products are di- or polysulfides. On the other hand, when secondary iodides are used, the products may be di- or polysulfides or they may be novel heterocyclic compounds depending upon the reaction conditions.

When primary iodides are used, the reaction involves reacting a compound having the general formula $$RC_1XFI$$

where R is as defined above, and X is a halogen having an atomic number less than 20, and provides compounds having the formula $$(RCFX)_2S_n$$

where R and X are as defined above, and $n$ is an integer from 2 to 5.

Among the primary iodides that may be used in the practice of this invention, the following may be cited as exemplary:

$C_2F_5CF_2I$, $CClF_2CF_2I$, $CF_3CF_2I$, $CClF_2CF_2CF_2I$
$CF_2ClCFClCF_2CFClI$, $C_3F_7CF_2I$, $C_4F_9CF_2I$
$CF_3CF_2CFClI$, $CF_3CFClI$, $CClF_2CF_2CFClI$, $C_3F_7CF_2CClI$
$CF_3CF(CF_3)CF_2CF_2I$, $CF_2ClCF(CF_3)CF_2CFClI$ and
$CF_2ClCFCl(CF_2CFCl)_3I$ It will be understood that the reaction may involve two molecules of the same iodide, or one molecule of each of two different iodides.

The reaction may be carried out under a variety of different conditions. Preferably ultraviolet or other forms of ionizing radiation such as $x$, $\gamma$, or high energy electron are used. Heat may also be employed to initiate the reaction.

The reaction temperature is not critical; and when ultra violet irradiation is used, the reaction may be carried out at room temperature or even lower, for example, at $-20°$ C. When heat alone is used, without ionizing radiation, the temperature should in general be above about 170° C. On the other hand, higher temperatures may be used and the reaction may be carried out at temperatures as high as or higher than 300° C. Pressure is also not critical, and generally may be from about atmospheric to about 10,000 p.s.i.g. Time of reaction is again not critical and may be from a matter of say ten minutes to several days. The proportions of mercuric sulfide used will depend to some extent upon the amount of sulfur it is desired to have in the final product. Generally between about one and about 20 mols of mercuric sulfide (HgS) will be present, per mol of iodide. Preferably at least 2 mols of HgS will be used per mol of iodide.

In carrying out the reaction of these primary iodides with mercuric sulfide any suitable technique may be employed. Conveniently, the ingredients are simply put into a suitable container such as a glass vessel, in an inert atmosphere, and heated to the desired temperature with stirring while being subjected to ultra violet irradiation from a suitable ultra violet source. In certain cases, particularly when the iodide is a solid, it may be desirable to use an inert solvent. Alternatively, the reaction may be carried out by passing the reactant through a glass tube which is subjected to ultra violet irradiation.

When secondary iodides are used, the reaction involves reacting a compound having the general formula $$RR'C_1FI$$

where R is selected from the class consisting of perfluoroalkyl groups having from 1 to about 30 carbon atoms and perfluorochloroalkyl groups having from 1 to about 30 carbon atoms and having the carbon atom $\alpha$ to the $C_1$ carbon atom in the formula free from chlorine atoms directly attached thereto and where R' is selected from the class consisting of perfluoroalkyl groups having from 1 to about 6 carbon atoms and perfluorochloroalkyl groups having from 1 to about 6 carbon atoms and having the carbon atom $\alpha$ to the $C_1$ carbon atom in the formula free from chlorine atoms directly attached thereto. R and R' may be the same, or different.

Among the secondary iodides that may be used in the practice of this invention, the following may be cited as exemplary:

It will be understood that the reaction may involve two molecules of the same iodide, or one molecule of each of two different iodides.

At temperatures below about 200° C. secondary iodides will in general enter into the same reactions as those indicated above for the primary iodides, i.e. they will form di- or polysulfides of the general formula $$(RR'CF)_2S_n$$

where R, R', and n are as defined above. At temperatures above about 150° C. the reaction proceeds smoothly regardless of whether or not ultra violet radiation is employed. Using ultra violet radiation the reactions will go at room temperature or even lower, for example, down to −20° C.

Above about 200° C., the formation of certain novel heterocyclic compounds to be described more fully below is favored, although some heterocyclic formation is encountered at temperatures above about 175° C. When ultra violet or other radiation is used, some heterocyclic product may be formed as low as 100° C.

In carrying out the reaction with secondary iodides pressure is not a critical factor. In general it will be between atmospheric and about 10,000 p.s.i.g. Time of reaction is again not critical and may be from about ten minutes to several days. However, if too short a reaction time is used, a mixture of the novel heterocyclic compound and di- or polysulfides may result even at temperatures over 200° C. To insure reasonable conversions to the heterocyclic compound a reaction time of at least 20 minutes should be used. The proportion of mercuric sulfide used will be generally from between about one mol to about 20 mols of mercuric sulfide per mol of iodide. To obtain reasonable conversion to the heterocyclic compound at least two mols of HgS should be present, per mol of secondary iodide.

As in the case of primary iodides, various conventional techniques may be employed for carrying out this process. Any suitable vessel may be used such as a stainless steel or Monel autoclave or, as in the process using ultra-violet irradiation, a glass vessel may be used. The ingredients may be placed in such a vessel or passed through a tube of similar material, mixed together with or without addition of an inert solvent, and subjected to heat or irradiation until the reaction is completed.

As has been stated, if a secondary perfluoroalkyl or perfluorochloroalkyl iodide is reacted with mercuric sulfide at temperatures in excess of 200° C., a novel heterocyclic compound is formed. In general, the other reaction conditions for the high temperature production of the heterocyclic compound are similar to those set forth above for the reaction of secondary iodides at temperatures of 200° C. or less, and similar reactants may be used. However, no ultra violet irradiation is required. The reaction may be carried out at temperatures of 300° C. or higher and a temperature range of from say 200° C. to 400° C. is considered practicable for this reaction although it is preferred to use temperatures from 200° C. to about 300° C. The excellent thermal stability of these cyclic compounds render them valuable as heat transfer fluids and high temperature coolants.

Identification tests indicate that the novel cyclic compounds formed from the secondary iodides described above have the general formula

where the R and R' substituents are as defined above. It is to be understood that the above formula includes the various possible stereoisomers. The two R's and the two R"'s may be the same or different and either or both R's may be the same as or different from either or both R"'s.

In order to determine the structure of the novel heterocyclic compounds of this invention, the reaction of 2-iodoperfluorohexane and mercuric sulfide was carried out at about 230° C. The reaction product was purified and analysed. The empirical formula for this product was $C_{12}F_{24}S_2$. This compound represents formally loss of one IF molecule from each of two $C_4F_9CFICF_3$ molecules with addition of two S atoms, i.e.

$$2C_6F_{13}I - 2IF + 2S = C_{12}F_{24}S_2$$

The nuclear magnetic resonance spectrum for this compound indicated the presence of three types of $-CF_2-$ groups and two types of $-CF_3$ groups, but no

group was indicated. The lack of

groups indicates that the IF was removed from the same carbon atom.

As evidence that the two S atoms were not bonded, the product was heated with excess chlorine at 90–110° C. for three hours and recovered unchanged. Such conditions cause a fluorocarbon disulfide, R—S—S—R, to be converted to the corresponding sulfenyl chloride, R—SCl. The compound was also heated to a temperature above 400° C. for one hour without change, and this stability favors the

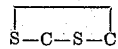

system of cyclic structure. From this and other evidence, it is concluded that this new compound has the structure

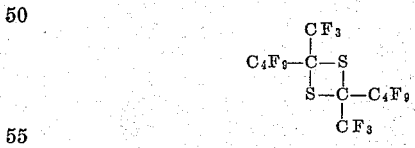

As noted above, the formation of the heterocyclic compounds appears to involve the removal of the elements of IF from the same carbon atom of each reactant iodide. It has also been noted that at lower temperatures and for shorter reaction times the interaction of 2-iodoperfluorohexane with mercuric sulfide gave predominantly perfluoro-2-hexyl polysulfides rather than the heterocyclic compound. These facts suggest that a di- or poly-sulfide formation is an intermediate step in the formation of the heterocyclic compounds. Evidence that this is actually the case, was the successful conversion of polysulfides, such as perfluoro-2-hexyl polysulfide, in the presence of mercuric sulfide to the corresponding heterocyclic compounds, such as $C_{12}F_{24}S_2$. None of the latter was observed when the polysulfides were heated alone.

Accordingly, the invention comprises a method for making heterocyclic compounds of the above type by the thermal reaction of a secondary perfluoroalkyl or perfluorochloroalkyl polysulfide and mercuric sulfide as well as from the secondary iodides. Stated more exactly, this aspect of the invention comprises a process in which compounds having the general formula

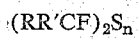

where $n$, R and R' are as defined above, are reacted with mercuric sulfide to provide compounds having the formula

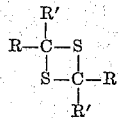

The reaction conditions, including temperature, pressure, reaction time and reagent proportions are the same as given above for the formation of the heterocyclic compounds directly from secondary iodides. The sulfides which are used as starting materials for this reaction may be prepared as hereinabove described or they may be prepared by the method set forth in the application of Murray Hauptschein et al. Ser. No. 646,202 filed March 14, 1957.

Although details of the mechanism have not fully been established, when a cyclic compound of the above character is prepared by the thermal reaction of secondary fluoro-iodide and mercuric sulfide, it is believed that the reaction proceeds according to the following equations which are cited as exemplary:

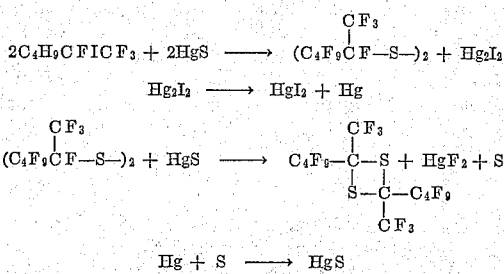

$$Hg + S \longrightarrow HgS$$

whereby the overall reaction is as follows:

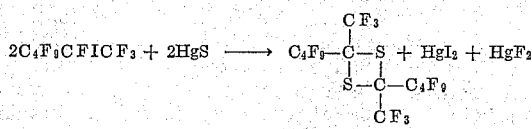

The novel heterocyclic compounds are non-corrosive and have excellent thermal stability, so that they can be used as heat transfer media, particularly in systems where iron, aluminum or other similarly constituted elements would present corrosion problems. They have low surface tension and can be used, for example, in automobile polishes to prevent dirt pick-up and make painted surfaces more resistant to deterioration. They also can be used as solvents, lubricants, dielectric fluids and working fluids in hydraulic systems.

The invention will be further described with reference to the following specific examples, it being understood that these examples are given for the purpose of illustration only and are not to be taken as in any way limiting the invention beyond the scope of the appended claims.

The mercuric sulfide used in the following examples was prepared by triturating small portions of mercury in a mortar with excess sulfur until completely consumed. The resulting greyish-black powder was exhaustively extracted with carbon disulfide in a Soxhlet extractor to remove unreacted sulfur. An X-ray pattern was identical to that of an authentic specimen of cubic HgS.

Example 1

Six grams (0.02 mole) of 1-iodoperfluoropropane and 14 g. (0.06 mole) of black mercuric sulfide are sealed under a dry high-purity nitrogen atmosphere in a 50 cc. Vycor No. 7910 ampoule. The tube is irradiated for 8 days at a distance of ca. 75 cm. by an Hanovia SH ultraviolet burner, used without the Woods filter, while shaking vigorously end to end in a horizontal position. The tube is cooled in Dry Ice and opened, and volatiles are transferred in vacuo to a small still. By distillation there is recovered 1.4 g. of the reactant iodide. A liquid fraction (1.2 g.), B.P. 60° at ca. 100 mm., $n_D^{23}$ 1.320, spectroscopically pure perfluoropropyl disulfide, is obtained as the sole reaction product in 38% yield. (Additional product probably remains adsorbed in the solid mercury salts.)

Analysis.—Calcd. for $C_6F_{14}S_2$: C, 17.9; F, 66.1; S, 15.9. Found: C, 18.2; F, 66.0; S, 15.9.

Example 2

In a heavy-wall Pyrex ampoule 5.9 g. (0.02 mole) of 1-iodoperfluoropropane and 11.7 g. (0.05 mole) of black mercuric sulfide are sealed under an atmosphere of dry high-purity nitrogen. The tube is heated for about 68 hours at temperatures of 225–230°. After cooling in Dry Ice, the tube is opened, and volatile products are transferred at ca. 0.1 mm. to a small Vigreux distillation unit. Distillation does not separate any pure materials. Infrared spectroscopic examination reveals the presence of some perfluoro-n-propyl disulfide.

Example 3

The compound $CF_3CF_2CFClI$ is reacted with black mercuric sulfide under ultraviolet irradiation, using the general technique of Example 1. Products having the formula $(CF_3CF_2CFCl)_2S_n$, are obtained, with $n$ being from 2 to 5.

Example 4

The procedure of Example 1 is repeated except that $CF_2ClCF_2CF_2I$ is used and compounds having the formula $(CF_2ClCF_2CF_2)_2S_n$, with $n$ being from 2 to 5, are obtained.

Example 5

A mixture of 8.9 g. (0.02 mole) of 2-iodoperfluorohexane, 11.7 g. (0.05 mole) of black mercuric sulfide and 13 ml. of 1,1,2-trichlorotrifluoroethane are sealed under nitrogen in a 60 cc. Vycor No. 7910 ampoule and irradiated for 8 days at approximately 25–45° C. with an Hanovia SH ultraviolet burner while shaking. The tube is cooled and opened, and the contents are filtered into a small still. By distillation of the filtrate there is obtained 1.5 g. of yellow liquid, B.P. 90°/8 mm.–103°/4mm., $n_D^{26}$ 1.3239; 1.9 g. yellow liquid, B.P. 97°/5 mm.–96°/1 mm., $n_D^{26}$ 1.3567; and ca. 1 g., B.P.>96°/1 mm., $n_D^{26}$ 1.3848. These fractions are shown spectroscopically to consist entirely of perfluoro-2-hexyl di- and polysulfides.

Example 6

The compound $CF_3CF_2CFICF_3$ and mercuric sulfide are sealed and irradiated using the technique of Example 5. Products having the formula $(CF_3CF_2CFCF_3)_2S_{2-5}$ are obtained.

Example 7

Under a dry high-purity nitrogen atmosphere, 8.9 g. (0.02 mole) of 2-iodoperfluorohexane and 11.7 g. (0.05 mole) of black mercuric sulfide are sealed in a heavy-wall Pyrex ampoule. The tube is heated in a molten salt bath at temperatures of 225–230° for 68.5 hours. After cooling in Dry Ice, the tube is opened, and the liquid portion of the reaction products is distilled at <0.1 mm. into a small Vigreux still. From this portion there are finally obtained by careful distillation 1.1 g. of a liquid, B.P. 53–59°, $n_D^{18}$ 1.28; 0.8 g. B.P. up to 55° at 100 mm., $n_D^{30}$ 1.308 shown spectroscopically to contain several components (not further characterized); and 3.5 g., B.P. 130–142° at 100 mm., main cut, B.P. 140–142° at 100 mm. and 36–37° at ca. 0.1 mm., a liquid, $n_D^{31}$ 1.331. Upon standing, white crystals, M.P. 62°, are deposited from the latter fraction for which the infrared spectrum is virtually the same (taking into account the normal differences between liquid and solid in Nujol mull spectra) as the mother liquor. The conversion to the heterocyclic $C_{12}F_{24}S_2$ is 53%.

The compound is used in place of a salt bath to furnish heat to a reaction carried out at 350° C., without perceptible decomposition.

Example 8

Following the procedure of Example 7,

$CF_2ClCF(CF_3)[CF_2CF(CF_3)]_3I$ is reacted with black mercuric sulfide at a temperature of about 235° C. for 16 hours. The product

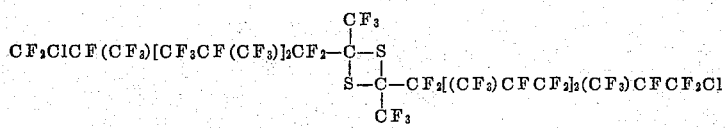

is obtained.

Example 9

Following the procedure of Example 7, $C_3F_7[CF_2CF(CF_3)]_9I$ is reacted with black mercuric sulfide at 250° C. for ten hours. The product

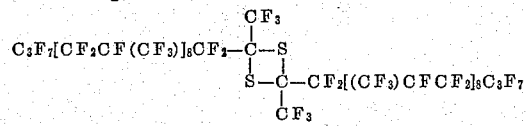

is obtained.

Example 10

The product of Example 7, heterocyclic $C_{12}F_{24}S_2$ is compounded into an automobile polish having the following formulation

| | Parts by weight |
|---|---|
| Carnauba wax | 4 |
| Ozoherite wax | 2 |
| Hard paraffin | 3.5 |
| Heterocyclic $C_{12}F_{24}S_2$ prepared as in Example 7 above | 0.5 |
| Mineral spirit | 40.0 |
| | 50.0 |

Applied to an enameled metal surface this material leaves a hard, glossy film having excellent moisture and dust resistance.

Example 11

By a procedure similar to that of Example 7, 4.5 g. (0.01 mole) of 2-iodoperfluorohexane and 3.2 g. (0.014 mole) of black mercuric sulfide are heated in a salt bath for 65 hours at a temperature of 235°. From the blue liquid product of this reaction there is obtained 0.4 g. of recovered iodide and ca. 2 g. (60% conversion) of pure $C_{12}F_{24}S_2$, liquid, B.P. 42–44° at ca. 0.1 mm., $n_D^{27}$ 1.338. On standing, nearly all of the liquid crystallizes into a white solid, M.P. 65°. Analyses for carbon, fluorine, and sulfur for the solid and the liquid are in agreement as are the infrared spectra, except for the slight differences between pure liquid and dispersed solid spectra noted previously and matching the infrared spectra obtained for the solid and liquid of the previous experiment.

*Analysis.*—Calcd. for $C_{12}F_{24}S_2$: C, 21.7; F, 68.7; S, 9.65. Found: C, 21.9; F, 69.9; S, 9.31.

Characteristic infrared absorption bands (in microns) of the supercooled liquid fraction are: 7.40, 8.20–8.24, 8.42, 8.81, 9.37, 9.68, 10.28, 10.79, 11.13, 12.77, 12.96, 13.42, 13.69, 13.84, 14.15, 14.5. No bands in the C—C region are present.

In order to determine the stability of this compound to the action of chlorine, a small Carius tube containing 0.6 g. of the heterocyclic $C_{12}F_{24}S_2$ and ca. 0.5 g. chlorine is sealed in vacuo and heated for 2.75 hours at 90–110°. The tube is cooled and opened and the chlorine is removed by heating the contents under reduced pressure. The residual material is shown by the infrared spectrum to be entirely the reactant $C_{12}F_{24}S_2$.

Example 12

By heating a mixture of 8.9 g. (0.02 mole) of 2-iodoperfluorohexane and 11.7 g. (0.05 mole) of black mercuric sulfide for 50 hours in an oil bath at 195° there is obtained 5.8 g. of liquid products boiling up to 50° at ca. 0.1 mm. which are shown by their infrared spectra to consist mainly of perfluoro-2-hexyl di- and polysulfides containing a small amount of heterocyclic $C_{12}F_{24}S_2$.

Example 13

Eleven and one-half g. (0.026 mole) of 2-iodoperfluorohexane and 14.5 g. (0.062 mole) of black mercuric sulfide are heated with shaking at 230° for 17 hours. The tube contents are extracted with 1,1,2-trichlorotrifluoroethane and filtered. The filtrate is distilled, and, after removal of the solvent, there is collected 4 g. of liquid distillate, B.P. 54–58°/20 mm., $n_D^{24}$ 1.334, which is shown spectroscopically to consist of approximately equal amounts of perfluoro-2-hexyl polysulfides and the heterocyclic $C_{12}F_{24}S_2$.

Example 14

One-half gram of mercuric sulfide and 1.7 g. of perfluoro-2-hexyl polysulfide are sealed in a Pyrex Carius tube and heated at 260–267° for one hour and at 270–279° for one additional hour. From this reaction there are finally obtained 1.2 g. of liquid product consisting of 30–35% of the heterocyclic $C_{12}F_{24}S_2$ (determined by infrared spectra) and 65–70% of unconverted polysulfides. Some etching is observed on the tube walls, and fluoride ion is confirmed in the residual solids. In addition, elemental sulfur is present.

None of the heterocyclic $C_{12}F_{24}S_2$ is detected when 1.5 g. of perfluoro-2-hexyl polysulfide is heated in a Pyrex Carius tube at 299–307° for 1.5 hours.

Example 15

Using the procedure of Example 14, the compound

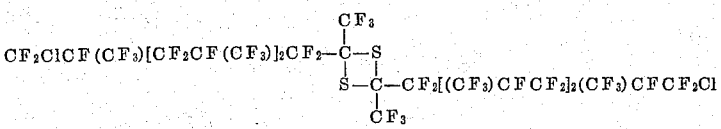
$CF_2ClCF(CF_3)[CF_2CF(CF_3)]_3$—S—S—
    $[(CF_3)CFCF_2]_3(CF_3)CFCF_2Cl$ is heated with black mercuric sulfide for one hour at 270° C. The heterocyclic compound $CF_2ClCF(CF_3)[CF_2CF(CF_3)]_2CF_2-\overset{CF_3}{\underset{|}{C}}-S$
$S-\overset{|}{C}-CF_2[(CF_3)CFCF_2]_2(CF_3)CFCF_2Cl$
$\overset{|}{CF_3}$ is obtained.

Example 16

Using the procedure of Example 14, the compound $C_3F_7[CF_2CF(CF_3)]_9$—S—S—$[(CF_3)CFCF_2]_9C_3F_7$ is heated with black mercuric sulfide for one-half hour at 290° C. The heterocyclic compound

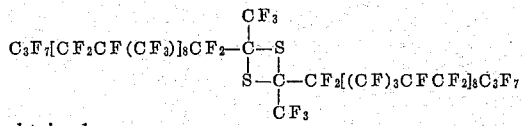

is obtained.

From a consideration of the foregoing specification it will be seen that the present invention provides a new method for making highly fluorinated polysulfides. These compounds, as brought out in copending application Ser. No. 646,202 referred to above, make good cutting oils.

The invention further provides novel heterocyclic compounds containing sulfur and fluorine. Two methods are provided for manufacturing this compound, both of which are simple and straightforward.

What we claim is:

1. A method for making organic fluorine compounds containing sulfur, which comprises reacting an iodide having the formula $$RC_1YFI$$

where R is a member of the class consisting of perfluoroalkyl groups having from 1 to about 30 carbon atoms and perfluorochloroalkyl groups having from 1 to about 30 carbon atoms in which the carbon atom $\alpha$ to the $C_1$ carbon atom in the formula is free from chlorine atoms directly attached thereto, and Y is a member of the class consisting of fluorine, chlorine, perfluoroalkyl groups having from 1 to about 6 carbon atoms and perfluorochloroalkyl groups having from 1 to about 6 carbon atoms in which the carbon atom $\alpha$ to the $C_1$ carbon atom in the formula is free from chlorine atoms directly attached thereto, with mercuric sulfide.

2. A method for making organic fluorine compounds containing sulfur, which comprises reacting a primary iodide having the formula $$RC_1XFI$$

where R is a member of the class consisting of perfluoroalkyl groups having from 1 to about 30 carbon atoms and perfluorochloroalkyl groups having from 1 to about 30 carbon atoms in which the carbon atom $\alpha$ to the $C_1$ carbon atom in the formula is free from chlorine atoms directly attached thereto, and X is a halogen having an atomic number of less than 20, with mercuric sulfide.

3. The method claimed in claim 2 wherein the reaction is carried out in the presence of ionizing radiation.

4. The method claimed in claim 2 wherein the reaction is carried out under ultraviolet radiation.

5. A method for making compounds having the formula $$(RC_1XF)_2S_n$$

where R is a member of the class consisting of perfluoroalkyl groups having from 1 to about 30 carbon atoms and perfluorochloroalkyl groups having from 1 to about 30 carbon atoms in which the carbon atom $\alpha$ to the $C_1$ carbon atom in the formula is free from chlorine atoms directly attached thereto, X is a halogen having an atomic number of less than 20 and $n$ is from 2 to about 5, which comprises reacting a compound having the general formula $$RC_1XFI$$

with mercuric sulfide.

6. The method claimed in claim 5 wherein R is a perfluoroalkyl group.

7. The method claimed in claim 5 wherein R is a perfluorochloroalkyl group.

8. The method claimed in claim 5 wherein X is fluorine.

9. The method claimed in claim 5 wherein X is chlorine.

10. A method for making compounds of the formula $$(CF_3CF_2CF_2)_2S_n$$

where $n$ is from 2 to about 5, which comprises reacting $CF_3CF_2CF_2I$ with mercuric sulfide.

No references cited.